United States Patent [19]
Hennrich et al.

[11] Patent Number: 5,593,088
[45] Date of Patent: Jan. 14, 1997

[54] HEATING DEVICE FOR MOTOR VEHICLES

[75] Inventors: Werner Hennrich, Fellbach; Clemens Bentele, Stuttgart, both of Germany

[73] Assignee: Mercedes-Benz AG, Stuttgart, Germany

[21] Appl. No.: 542,777

[22] Filed: Oct. 13, 1995

[30] Foreign Application Priority Data

Oct. 15, 1994 [DE] Germany ................ 44 36 943.3

[51] Int. Cl.⁶ .................................................. B60H 1/02
[52] U.S. Cl. ........................... 237/12.3 C; 236/100
[58] Field of Search ................ 237/12.3 B, 12.3 C; 236/100

[56] References Cited

U.S. PATENT DOCUMENTS

| 451,825 | 10/1977 | Elder | 237/12.3 B |
|---|---|---|---|
| 4,018,380 | 4/1977 | Baier | 237/12.3 C |
| 4,394,960 | 7/1983 | Nakazawa | 237/12.3 C |
| 4,883,226 | 11/1989 | Tomita et al. | 237/12.3 B |
| 4,892,248 | 1/1990 | Robin et al. | 237/12.3 C |
| 4,976,463 | 12/1990 | Soo | 237/12.3 C |
| 5,014,910 | 5/1991 | Koch et al. | 237/12.3 C |
| 5,211,333 | 5/1993 | Schmalenbach et al. | 237/12.3 C |
| 5,333,678 | 8/1994 | Mellum et al. | 237/12.3 C |

FOREIGN PATENT DOCUMENTS

| 1961286 | 7/1971 | Germany. |
|---|---|---|
| 4307841C1 | 1/1994 | Germany. |
| 4314089C1 | 3/1994 | Germany. |

*Primary Examiner*—William E. Tapoicai
*Attorney, Agent, or Firm*—Evenson McKeown Edwards & Lenahan, PLLC

[57] ABSTRACT

A heating device is provided for motor vehicles with a water-cooled internal combustion engine, which heating device has a heat exchanger which is acted on by the cooling water circuit of the internal combustion engine on the one hand and by an auxiliary heating unit which is independent of the internal combustion engine on the other hand. A thermostatically activated switching element causes the hot water to flow via the heat exchanger below a temperature prescribed by the thermostat, when the auxiliary heating unit is switched on, and to flow additionally via the internal combustion engine above this temperature, and causes the engine cooling water to flow via the heat exchanger when the auxiliary heating unit is switched off. In order to achieve low production costs and a large degree of robustness of the switching element it is equipped with a non-return valve whose blocking direction is directed from an outflow chamber to an inflow chamber. The inflow chamber and outflow chamber are connected to one another via at least one leakage hole. The thermostat is arranged in the inflow chamber and provided with an activation element which opens the non-return valve above a prescribed temperature in the inflow chamber and thus enables the through-flow from the outflow chamber to the inflow chamber.

10 Claims, 2 Drawing Sheets

5,593,088

HEATING DEVICE FOR MOTOR VEHICLES

BACKGROUND AND SUMMARY OF THE INVENTION

The invention relates to a heating device for motor vehicles with a water-cooled internal combustion engine.

In a known heating device (German Patent Document DE 19 61 286 A1), a thermostatically activated switching element has three valves and a bypass between two inlets of the valve. A first valve is constructed as a non-return valve and is directly assigned to the outlet, connected to the auxiliary heating unit, of the switching element. A second valve which is controlled by the thermostat controls the connection between the first inlet, connected to the heat exchanger, and the outlet as well as the connection between a second inlet, connected to the water cooling circuit of the engine, and the outlet of the switching element. A third valve which is controlled by the thermostat is directly assigned to the second inlet of the switching element.

When the engine is deactivated (stationary mode) and the auxiliary heating unit is switched on, the third valve is closed and the second valve is opened and the heat exchanger is connected to the auxiliary heater. When a prescribed water temperature is reached, the thermostat opens the third valve and hot water flows via the heat exchanger on the one hand and via the cold engine on the other, and the engine is preheated. As the temperature rises further, the thermostat closes the second valve and blocks off the heat exchanger. The water which is heated by the auxiliary heating unit flows exclusively via the engine and brings it up to operating temperature. If the engine is started and if it supplies sufficient hot water via the cooling water circuit and if the auxiliary heating unit is switched off, hot water is pumped back to the engine via the heat exchanger, via the bypass and via the opened third valve by the water pump in the cooling circuit of the engine. Such a switching element with three valves, a thermostat and a bypass has a very complex structure and makes the heating device more expensive without substantially increasing its effectiveness.

In a known heating device of the type mentioned at the outset (German Patent Document DE 43 14 089 C1), the thermostat which is arranged in the outflow chamber and is constructed as an element made of expanding material activates a main valve plate which is pressed in a sealing fashion under the force of a closing spring onto a flange ring which is arranged between the inflow chamber and outflow chamber. At a selectable set temperature of the heating water which flows from the auxiliary heating unit to the heat exchanger via the outflow chamber, the thermostat which is arranged in the outflow chamber lifts off the main valve plate from the flange ring and some of the heating water flows out of the outflow chamber via the inflow chamber into the cooling water circuit of the internal combustion engine so that the latter is preheated and reaches its operating temperature more quickly. The nonreturn valve which is also arranged between the inflow chamber and outflow chamber and has a blocking direction which points towards the inflow chamber is formed by a subsidiary valve plate which is pressed on to the main valve plate under the force of a compression spring and, at the same time, closes off the through-holes present in the main valve plate. The subsidiary valve plate lifts off from the main valve plate and thus clears the connection between the inflow chamber and outflow chamber if the pressure, produced by the circulation pump after the circulation pump in the cooling water circuit of the internal combustion engine is switched on, is high enough to overcome the pressing-on force of the compression spring. Thus, the heated-up cooling water which flows into the inflow chamber from the internal combustion engine returns to the internal combustion engine via the outflow chamber and the heat exchanger as well as through the auxiliary heating unit. If the temperature of the cooling water exceeds the set temperature of the thermostat, the latter also lifts off the main valve plate from the flange ring so that a greater flow orifice between the inflow chamber and outflow chamber is cleared. Such a switching element with two integrated valves is constructionally very complex, which results in substantially higher production costs of the switching element.

An object of the invention is to substantially simplify, and make less susceptible to faults, the switching element in a heating device of the type mentioned at the outset, and, at the same time, maintain the fundamental mode of operation of engine heating and stationary-mode heating.

This object is achieved according to the invention in a heating device for motor vehicles of the generic type discussed above by providing an arrangement wherein the inflow chamber and outflow chamber are connected to one another via at least one leakage hole, and wherein the thermostat is arranged in the inflow chamber and has an activation element which lifts off the valve element of the non-return valve from its valve seat above a prescribed temperature.

In the heating device according to the invention, apart from the thermostat the switching element only contains a single valve and constitutes a complete unit which is easy to produce, simple to mount and only has to be connected to the rest of the heating system at the three connectors. The switching valve which is constructed as a non-return valve with additional activation by the thermostat is robust and has little susceptibility of faults.

Other objects, advantages and novel features of the present invention will become apparent from the following detailed description of the invention when considered in conjunction with the accompanying drawings.

DETAILED DESCRIPTION OF THE DRAWINGS

Figure 1:
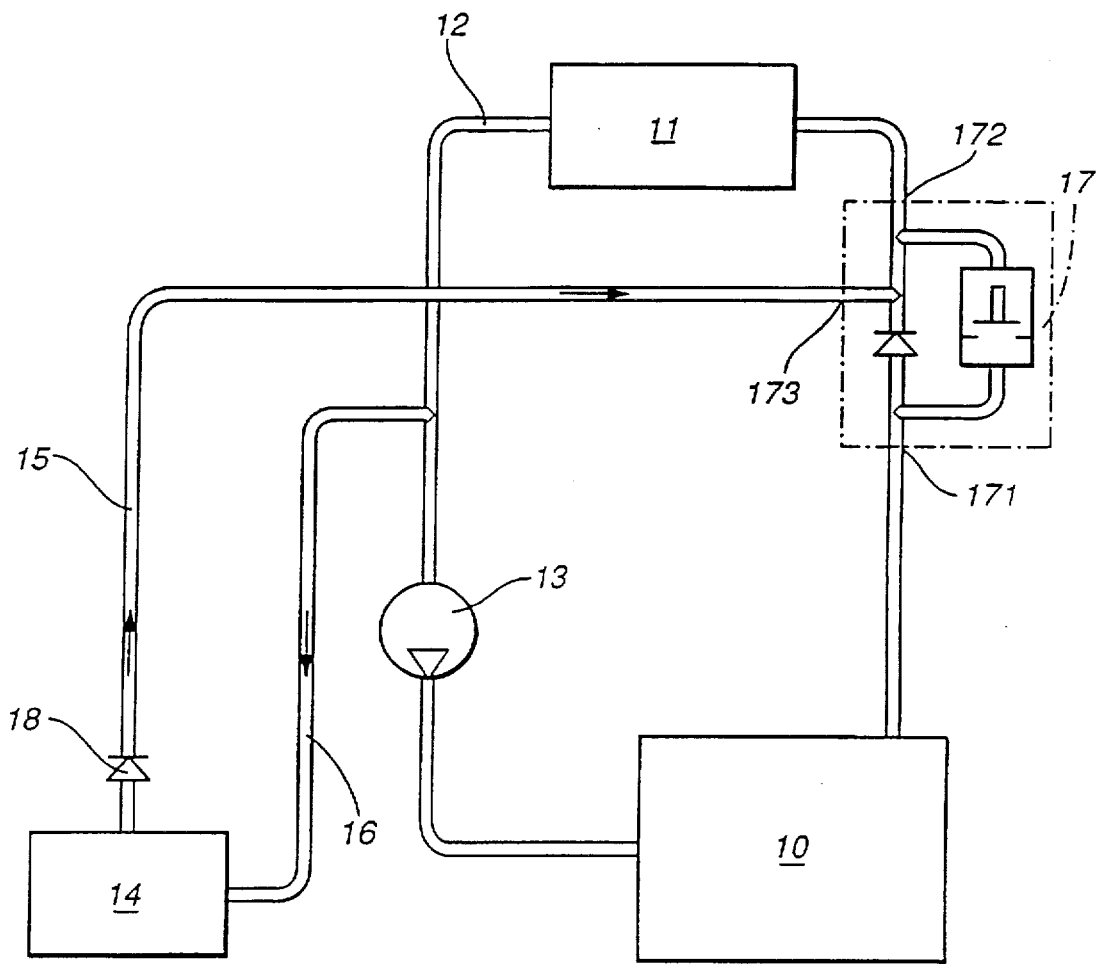
FIG. 1 shows a schematic view of a heating device for motor vehicles with a water-cooled internal combustion engine, constructed according to a preferred embodiment of the present invention.

In the heating device (illustrated schematically in FIG. 1) for a motor vehicle with water-cooled internal combustion engine, the internal combustion engine is symbolized by block 10 and the water/air heat exchanger of the heating device is designated by 11. The water/air heat exchanger 11 is connected at the water side to the cooling water circuit 12 of the internal combustion engine 10, in which circuit 12 an electric water pump 13 for circulating the cooling water which has been heated up by the internal combustion engine 10 is also connected. When the internal combustion engine 10 is operationally warm and when there is a requirement for heating, air is routed via the heat exchanger 11 and directed into the passenger compartment of the motor vehicle. Here, the air flowing through the heat exchanger absorbs heat from the cooling water and, in turn, heats up the passenger compartment.

In order to heat up the passenger compartment when the internal combustion engine is deactivated, that is to say for so-called stationary-mode heating, an auxiliary heating unit 14 is provided which is connected to the heat exchanger 11 parallel to the cooling water circuit 12 via connecting lines 15 and 16. The auxiliary heating unit 14 contains a fuel burner by which the water routed through the auxiliary heating unit 14 is heated up and a circulation pump for producing a flow of water through the auxiliary heating unit 14. A switching element 17 with three ports 171, 172 and 173 is connected in the cooling water circuit 12 between the cooling water outlet of the internal combustion engine 10 and the inlet of the heat exchanger 11 in order to operate the heat exchanger 11 with the cooling water circuit 12 of the internal combustion engine 10 and the auxiliary heating unit 14, as desired. Here, the port 171 is connected to the internal combustion engine 10, the port 172 is connected to the heat exchanger 11 and the port 173 is connected to the connecting line 15, which functions as an inflow line to the switching element 17, of the auxiliary heating unit 14, which connecting line 15 contains, for this purpose, a non-return valve 18 whose through-flow direction is directed from the auxiliary heating unit 14 to the switching element 17. The connecting line 16, serving as a return line of the auxiliary heating unit 14, is connected to the cooling water circuit 12 between the outlet of the heat exchanger 11 and the inlet of the water pump 13.

Figure 2:
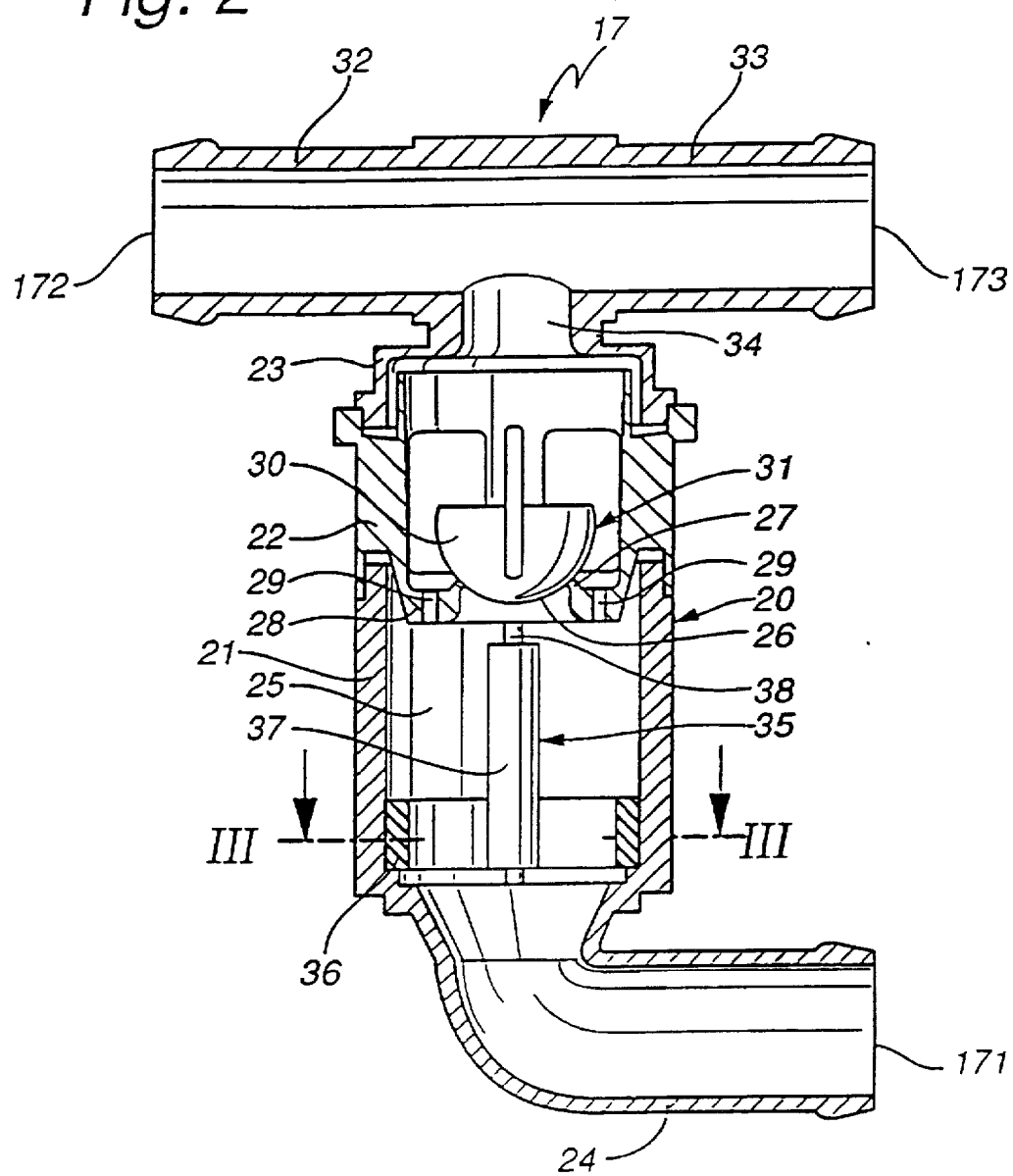
FIG. 2 shows a longitudinal section of a switching element in the heating device according to FIG. 1.
Figure 3:
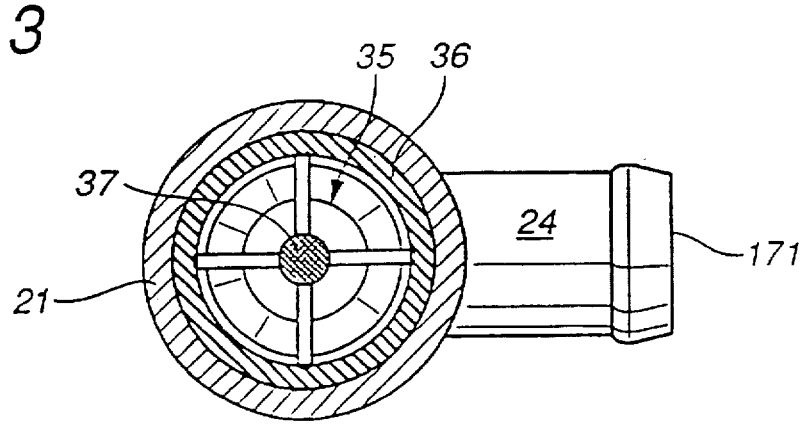
FIG. 3 shows a section along the line III—III in FIG. 2.

The constructional design of the switching element 17 can be seen in FIG. 2 in which the switching element 17 is represented in longitudinal section. The switching element 17 has a three-component housing 20 with a lower housing component 21, a central housing component 22 and an upper housing component 23. A connector 24 which forms the port 171 of the switching element 17 is formed onto the lower housing component 21. An inflow chamber 25 is constructed in the interior of the lower housing component 21. The central housing component 22 is fitted coaxially onto the lower housing component 21. A valve seat 27 which surrounds a valve opening 26 is constructed on the central housing component 22 on its underside which is fitted onto the lower housing component 21. Axial leakage holes 29 are provided in an annular web 28 which is left between the valve seat 27 and the internal wall of the central housing component 22. A valve element 30 of a non-return valve 31 interacts with the valve seat 27, the said non-return valve 31 being guided in the central housing component 22 in an axially displaceable fashion and being constructed in such a way that when the inflow chamber 25 is supplied with water it lifts off from the valve seat 27 and thus opens the non-return valve 31. The upper housing component 23 is fitted coaxially onto the central housing component 22. Two connectors 32 and 33 which form the ports 172 and 173 of the switching element 17 are formed on the housing component 22. The two connectors 32, 33 are connected to an outflow chamber 34 which is constructed in the interior of the upper housing component 23 and is itself connected to the interior of the central housing component 22.

A thermostat 35 is arranged in the lower housing component 21 and is secured by means of an attachment ring 36 to the floor of the lower housing component 21 from which the connector 24 extends. The thermostat 35 comprises a wax cartridge 37 from which an activation pin 38 protrudes axially. The wax cartridge 37 with activation pin 38 are arranged coaxially with respect to the axis of the housing 20.

When heated up, the wax in the wax cartridge 37 expands and the activation pin 38 is pushed out of the wax cartridge 37 towards the valve element 30. During this process, the thermostat 35 is set in such a way that when a desired temperature is reached the activation pin 38 comes into contact with the valve element 30 of the non-return valve 31 and lifts the latter off from the valve seat 27 80 that the throughflow from the outflow chamber 34 to the inflow chamber 25 is also produced in the blocking direction of the nonreturn valve 31.

The mode of operation of the heating device described is as follows:

When the internal combustion engine 10 is deactivated and the auxiliary heating unit 14 is switched on, hot water passes from the auxiliary heating unit 14 to the connector 33 via the connecting line 15, enters the outflow chamber 34, presses the valve element 30 onto the valve seat 27 here and flows on to the heat exchanger 11 via the connector 32, gives off its heat there to the air flowing through the heat exchanger 11 and returns via the connecting line 16 to the auxiliary heating unit 14 where it is heated up again. The air heated in the heat exchanger 11 is fed to the passenger compartment and the latter is warmed up. During this process relatively small amounts of hot water pass via the leakage holes 29 into the inflow chamber 25 and heat up the thermostat 35 here. As a result of the heating, the wax in the wax cartridge 37 expands and the activation pin 38 is pushed gradually in the direction of the valve element 30. If the prescribed desired temperature is reached, the activation pin 38 lifts off the valve element 30 from the valve seat 27. Now, hot water also flows out of the inflow chamber 25 into the outflow chamber 34 via the opened non-return valve 31 and passes from here via the connector 24 to the internal combustion engine 10. In this position of the switching element 17, the hot water heated up by the auxiliary heating unit 14 also flows through the internal combustion engine 10 via the cooling water circuit 12 and it heats up gradually. If the heating valves are closed, the hot water of the auxiliary heating unit 14 flows exclusively via the internal combustion engine 10 so that the latter is heated up to operating temperature very quickly.

If the internal combustion engine 10 is started and if the cooling water has been heated up to operating temperature and if the auxiliary heating unit 14 is then switched off, the cooling water which is heated up by the internal combustion engine 10 flows into the inflow chamber 25 via the connector 24 and on to the heat exchanger 11 via the non-return valve 31 and returns to the internal combustion engine 10 via the water pump 13. The flow of hot water to the auxiliary heating unit 14 is blocked by the non-return valve 18 in the connecting line 15. A leakage hole which permits a small quantity of hot water to flow to the auxiliary heating unit 14 counter to the direction of the arrow in FIG. 1 may also be provided in the non-return valve 18 (not illustrated here). As a result, when the heating valve at the heat exchanger 11 is blocked the water temperature in the auxiliary unit 14 does not drop to such an extent that the auxiliary heating unit 14 switches on unnecessarily.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Heating device for motor vehicles with a water-cooled internal combustion engine, with a water/air heat exchanger which is connected to a cooling water circuit of the internal combustion engine on the one hand and to an auxiliary heating unit which is independent of the internal combustion engine on the other hand, and with a thermostatically activated switching element which is constructed such that when the auxiliary heating unit is switched on the heating water heated up by the auxiliary heating flows via the heat exchanger below a temperature prescribed by the switching element and additionally via the internal combustion engine above the prescribed temperature, and when the auxiliary heating unit is switched off the engine cooling water heated up by the internal combustion engine flows via the heat exchanger, for which purpose the switching element has an inflow chamber which is connected to the cooling circuit of the internal combustion engine and an outflow chamber which is connected both to the heat exchanger and to the auxiliary heating unit as well as a non-return valve which is arranged between the inflow chamber and outflow chamber and has a valve element and valve seat, the blocking direction of which non-return valve is directed towards the inflow chamber, wherein the inflow chamber and outflow chamber are connected to one another via at least one leakage hole, and wherein the thermostat is arranged in the inflow chamber and has an activation element which lifts off the valve element of the non-return valve from its valve seat above a prescribed temperature.

2. Heating device according to claim 1, wherein the thermostat is constructed as a wax cartridge with an activation pin, which wax cartridge is arranged axially with respect to the valve element and increasingly pushes the activation pin out axially as the temperature increases.

3. Heating device according to claim 1, wherein the switching element has a three-component housing which has:

a cylindrical lower component which surrounds the inflow chamber and has a connector formed thereon for connecting the cooling water circuit of the internal combustion engine, a central component which is fitted onto the lower component and receives the valve element in an axially displaceable fashion and on which the valve seat is constructed, and an upper component which is fitted onto the central component and contains the outflow chamber and on which two connectors for connecting the auxiliary heating unit and heat exchanger are constructed.

4. Heating device according to claim 2, wherein the switching element has a three-component housing which has:

a cylindrical lower component which surrounds the inflow chamber and has a connector formed thereon for connecting the cooling water circuit of the internal combustion engine, a central component which is fitted onto the lower component and receives the valve element in an axially displaceable fashion and on which the valve seat is constructed, and an upper component which is fitted onto the central component and contains the outflow chamber and on which two connectors for connecting the auxiliary heating unit and heat exchanger are constructed.

5. Heating device according to claims 1, wherein a non-return valve with a blocking direction which is directed towards the auxiliary heating unit is arranged in the inflow line from the auxiliary heating unit to the outflow chamber of the switching element.

6. Heating device according to claim 2, wherein a non-return valve with a blocking direction which is directed towards the auxiliary heating unit is arranged in the inflow line from the auxiliary heating unit to the outflow chamber of the switching element.

7. Heating device according to claim 3, wherein a non-return valve with a blocking direction which is directed towards the auxiliary heating unit is arranged in the inflow line from the auxiliary heating unit to the outflow chamber of the switching element.

8. Heating device according to claim 5, wherein a leakage hole which provides a small amount of heating water to flow in the blocking direction of the non-return valve is provided in the non-return valve.

9. Heating device according to claim 6, wherein a leakage hole which provides a small amount of heating water to flow in the blocking direction of the non-return valve is provided in the non-return valve.

10. Heating device according to claim 7, wherein a leakage hole which provides a small amount of heating water to flow in the blocking direction of the non-return valve is provided in the non-return valve.

* * * * *